United States Patent Office 3,824,145
Patented July 16, 1974

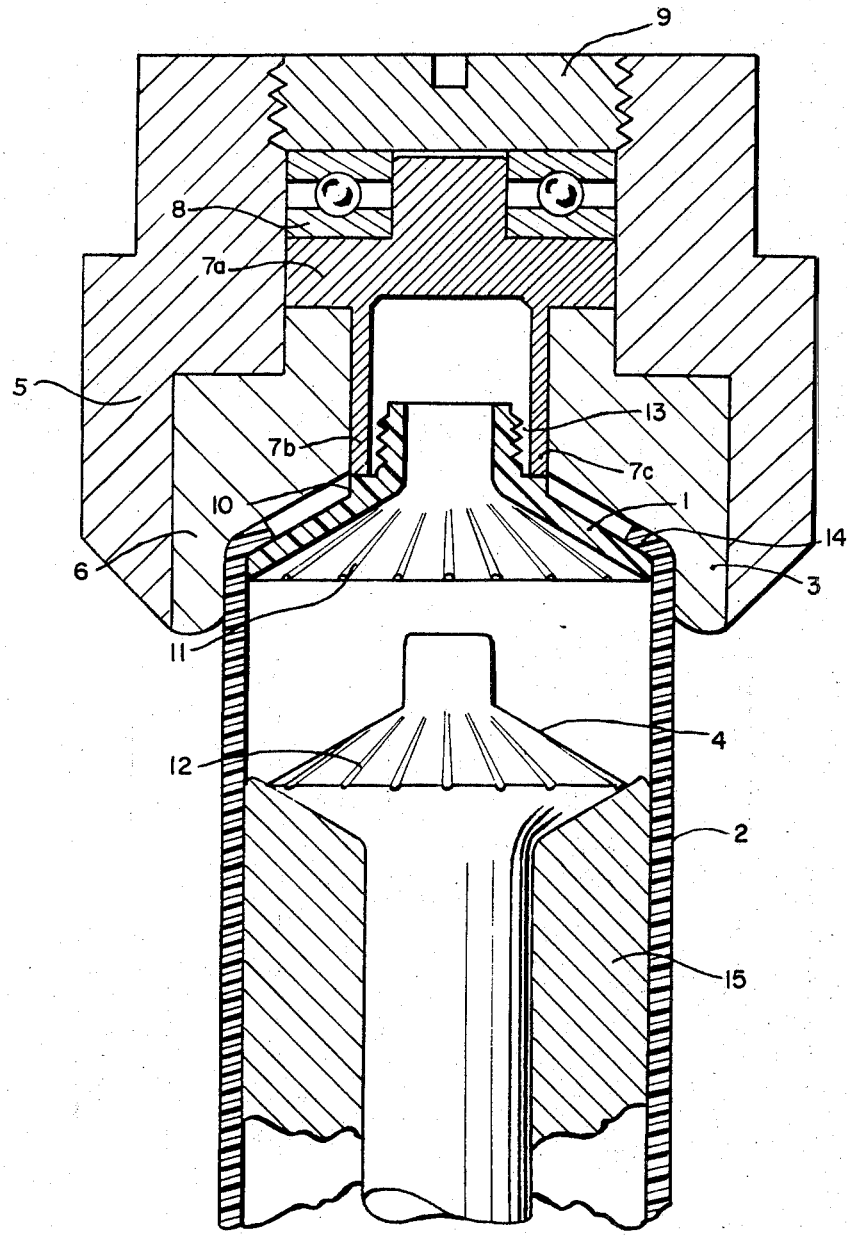

---

3,824,145
APPARATUS FOR BONDING A THERMOPLASTIC TUBULAR PART TO THE PERIPHERY OF A THERMOPLASTIC TUBE HEAD
Valer Flax, Vic-Fezensac, France, assignor to Continentalplastic AG., Zug, Switzerland
Original application June 4, 1970, Ser. No. 43,428, now abandoned. Divided and this application Oct. 25, 1972, Ser. No. 300,792
Claims priority, application Switzerland, June 4, 1969, 9,526/69
Int. Cl. B29c 27/08
U.S. Cl. 156—580
2 Claims

ABSTRACT OF THE DISCLOSURE

In a method of manufacturing a tube of thermoplastic material, a head and a tubular part of thermoplastic material are bonded together by friction welding, i.e. by a very rapid rotation of the head catched between a rotary tool and a cap.

---

This application is a division of Ser. No. 43,428, filed June 4, 1970, now abandoned.

Tubes made of thermoplastic materials for conditioning fluid and paste products are manufactured, according to a known method, by assembling the tubular body with the head, by bonding, which is obtained by friction welding by imparting to the head a very rapid rotating motion while the end of the tubular part is strongly pressed against the head, the heat generated by the friction of the surfaces pressed one against the other causing a fusion of these surfaces which results in the bonding of the edge of the tubular part with the peripheric zone of the head. The neck of the latter is usually provided with a screw-thead to take the closure cap.

A known gear for the production of these conditioning tubes by means of friction welding consists of a rotating tool having a toothed surface and of a hollow cap the profile of which closely fits the upper face of the head in order to press the latter against the rotary tool during the friction welding operation.

However, under the effect of the pressure exerted by the cap on the head rotated by the toothed tool, an important displacement of the plastic material of the head towards the center of the same inevitably occurs. This displacement of the material towards the center of the head is undesirable and inconvenient, as it causes the screw-thread of the head to be covered over, thus preventing the threaded closure cap from being fitted correctly. Tubes manufactured by means of this known gear can scarcely be used, the screw-thread of the neck being defective.

The object of the invention is to avoid the above-mentioned disadvantages and the invention concerns a method for the manufacture of a tube of thermoplastic material by bonding together a head and a tubular part of thermoplastic material by friction welding, effected by causing a very rapid rotation of the head imprisoned between a rotating tool and a cap. A strong pressure is preferably exerted on a circular elastic edge surrounding the screw-thread of the head during the friction welding operation. The gear for carrying out this method is characterized by the fact that the cap comprises a central rotary tubular core surrounded by a non-rotating crown.

The accompanying drawing illustrates, by way of an example, a schematic cross-section of an embodiment of the gear according to the invention.

The screw-thread 13 of the head 1 is surrounded by an elastic collar 10 produced integrally with the head and against which is freely rotating tubular metallic core 7b is strongly pressed, the base 7a of the core being carried by a ball bearing 8 seated in a casing 5 and held in place by a threaded nut 9. This nut serves to adjust the pressure which must be exerted by the end 7c of the core 7b on the elastic collar 10 when a rotary tool 4 causes the head 1 to rotate. In order to prevent slipping, the upper face of this rotary tool 4 is provided with radial grooves 12, corresponding to radial striations 11 provided on the inner face of the head 1.

A fixed crown 6 is secured in the casing 5 and exerts a pressure on the end 14 of the tubular part 2 in order to apply it against the head 1 during the welding operation, the whole of the casing 5 being moved axially towards the rotary tool 4 to accomplish this operation.

In order to facilitate comprehension, the casing 5 is shown in a position where it is still at a distance from the rotary tool 4, it being understood that before effecting assembly, the tubular part 2 of thermoplastic material will be slipped over the rotary tool 4 to be fitted on the metallic mandrel 15, which does not rotate, the head 1, also made of thermoplastic material being placed on the rotary tool 4.

The cap 7a in its casing 5 and the rotary tool 4 are now moved axially towards one another, in order to clamp the head 1 under pressure between the two members, cap 5 on one side and rotary tool 4 on the other, the elastic collar 10 of thermoplastic material which surrounds the screw-thread 13 being strongly compressed by the pressure exerted by the end 7c of the metallic cylinder 7b.

According to a modification of the invention, not shown in the drawing, the cylinder 7b will have a diameter which is slightly less than that of the head 1 thus resting against the latter very near the edge 14 of the tubular part 2, and thus preventing any displacement of the material towards the center of the head during the rotation of the latter in the course of the welding operation.

What is claimed is:

1. Apparatus for bonding a thermoplastic tubular part to the periphery of a thermoplastic tube head comprising a frusto-conical portion attached at its smaller end to a cylindrical nozzle section having threads on the external surface thereof and having an elastic shoulder upstanding from the frusto-conical surface at the junction of said frusto-conical surface and said cylindrical nozzle section, said apparatus comprising
   a cap having a rotatable portion for positively engaging the upstanding elastic shoulder portion of said tube head and a fixed portion for engaging the end of said tubular part, and
   an axially displaceable rotary tool for engaging the inner side of said tube head and compressing said head between said rotary tool and the rotatable portion of said cap so that there is no movement between the rotatable portion of the cap and the head at said shoulder, rotation of said head with respect to said tubular part friction welding said head to said tubular part without distorting the threaded cylindrical nozzle portion of said head.

2. Apparatus as defined by claim 1 wherein the rotatable portion of said cap is a tubular core and which further comprises a ball bearing supporting said core and an adjusting nut for retaining said bearing.

References Cited

UNITED STATES PATENTS

| 3,074,837 | 1/1963 | Flax | 156—69 |
| 3,446,688 | 5/1969 | Flax | 156—580 |
| 3,690,088 | 9/1972 | Anderson | 156—73 |

DOUGLAS J. DRUMMOND, Primary Examiner

M. G. WITYSHYN, Assistant Examiner

U.S. Cl. X.R.

228—2; 264—68